US008255965B2

(12) United States Patent
Choi

(10) Patent No.: US 8,255,965 B2
(45) Date of Patent: Aug. 28, 2012

(54) URL ACCESS METHOD AND MOBILE TERMINAL THEREOF

(75) Inventor: Kwang-Hun Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 583 days.

(21) Appl. No.: 12/042,193

(22) Filed: Mar. 4, 2008

(65) Prior Publication Data

US 2008/0307476 A1 Dec. 11, 2008

(30) Foreign Application Priority Data

Jun. 8, 2007 (KR) ........................ 10-2007-0056297

(51) Int. Cl.
*H04N 7/173* (2011.01)

(52) U.S. Cl. .............. 725/112; 725/34; 725/40; 725/43; 725/51; 725/110

(58) Field of Classification Search .................... 725/34, 725/40, 43, 45, 46, 51, 109–110, 112
See application file for complete search history.

(56) References Cited

U.S. PATENT DOCUMENTS

| | | | | |
|---|---|---|---|---|
| 7,409,701 | B1 * | 8/2008 | Tiphane | 725/105 |
| 7,444,659 | B2 * | 10/2008 | Lemmons | 725/34 |
| 2004/0194131 | A1 * | 9/2004 | Ellis et al. | 725/34 |
| 2005/0003840 | A1 * | 1/2005 | Nakano | 455/466 |
| 2006/0195870 | A1 * | 8/2006 | Teichner et al. | 725/75 |
| 2007/0082602 | A1 | 4/2007 | Park | |
| 2007/0183744 | A1 * | 8/2007 | Koizumi et al. | 386/83 |
| 2007/0232226 | A1 | 10/2007 | Kajitani | |

FOREIGN PATENT DOCUMENTS

| | | | | |
|---|---|---|---|---|
| CN | 1791227 | A | | 6/2006 |
| EP | 1 494 479 | A1 | | 7/2004 |
| WO | WO 2005/045603 | A2 | | 5/2005 |
| WO | WO 2005086477 | A1 | * | 9/2005 |
| WO | WO 2005/114993 | A1 | | 12/2005 |

* cited by examiner

*Primary Examiner* — Kristine Kincaid
*Assistant Examiner* — Sumaiya A Chowdhury
(74) *Attorney, Agent, or Firm* — Birch, Stewart, Kolasch & Birch, LLP

(57) ABSTRACT

A method, mobile terminal and computer program product for automatically accessing a specific URL, and a mobile terminal thereof. The method comprises outputting a broadcasting screen by receiving a broadcasting signal; when the broadcasting screen is not displayed, automatically accessing a preset specific URL; displaying a broadcasting list including one or more URL lists; selecting one or more URLs included in each item of the broadcasting list; and accessing a web site or a server of the selected URL.

16 Claims, 15 Drawing Sheets

URL ACCESS METHOD AND MOBILE TERMINAL THEREOF

CROSS REFERENCE TO RELATED APPLICATION

The present invention relates to subject matter contained in priority Korean Application No. 10-2007-0056297, filed on Jun. 8, 2007, which is herein expressly incorporated by reference in its entirety.

BACKGROUND OF THE INVENTION

1. Field of the Invention

The present invention relates to a mobile terminal and a Uniform Resource Locator (URL) access method and computer program product thereof, and more particularly, to a method and computer program product for automatically accessing a specific URL and a mobile terminal having the same.

2. Description of the Background Art

In the related art mobile terminal, when a broadcasting signal is not received or a broadcasting screen is not outputted even if a broadcasting signal is received, a screen that informs that an output of a broadcasting signal is not allowed or a screen having no broadcasting signal is outputted.

SUMMARY OF THE INVENTION

An object of the present invention is to provide a URL access method and computer program product capable of automatically accessing a specific URL in a broadcasting mode when a broadcasting signal is not received or when a broadcasting screen is not outputted even if a broadcasting signal is received, and a mobile terminal thereof.

Another object of the present invention is to provide a URL access method and computer program product capable off outputting a specific URL list in a broadcasting mode, and capable of directly accessing a URL selected by a user in the broadcasting mode, and a mobile terminal thereof.

Still another object of the present invention is to provide a URL access method and computer program product capable of returning to a broadcasting mode when a URL access is to be ended, and a mobile terminal thereof.

To achieve these and other advantages and in accordance with the purpose of the present invention, as embodied and broadly described herein, there is provided a URL access method and computer program product for a mobile terminal that includes outputting a broadcasting signal thereby displaying a broadcasting screen therefor; and when the broadcasting screen is not displayed, automatically accessing a preset URL.

According to another aspect of the present invention, the URL access method and computer program product for a mobile terminal that includes displaying a broadcasting list having one or more URL lists; selecting one or more URLs included in each item of the broadcasting list; and accessing a web site or a server of the selected URL.

To achieve these and other advantages and in accordance with the purpose of the present invention, as embodied and broadly described herein, there is also provided a mobile terminal that includes a receiving unit for receiving a broadcasting signal; a displaying unit for displaying at least one of a broadcasting signal, broadcasting information or URL information received from the receiving unit; an inputting unit for inputting one of the broadcasting information and the URL information; and a controller for controlling an URL access when the URL information is inputted by the inputting unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and an incorporated in and constitute a part of this specification, illustrate embodiments of the invention and together with the description serve to explain the principles of the invention.

DETAILED DESCRIPTION OF THE INVENTION

Reference will now be made in detail to the preferred embodiments of the present invention, examples of which are illustrated in the accompanying drawings.

Figure 1:
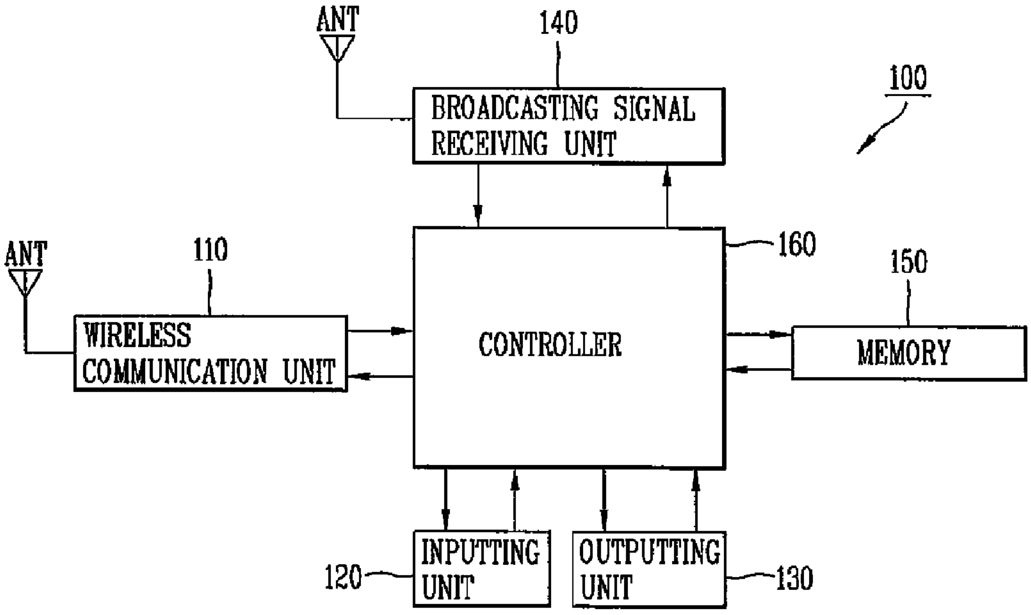
FIG. 1 is a block diagram showing a configuration of a mobile terminal that is accessible to a specific URL according to the present invention.

FIG. 1 is a block diagram showing a configuration of a mobile terminal that is accessible to a specific URL according to the present invention.

Referring to FIG. 1, a mobile terminal according to the present invention comprises a wireless communication unit 110; a broadcasting signal receiving unit 140 for receiving a radio broadcasting signal, or a TV broadcasting signal, or a wired or wireless network (e.g., Internet/extranet) broadcasting signal; a displaying unit 130 for displaying at least one of a broadcasting signal, and broadcasting information or URL information received from the receiving unit; an inputting unit 120 for inputting one of the broadcasting information and the URL information by a user; a memory 150 for storing the broadcasting information or the URL information; and a controller 160 for controlling each component to perform a command inputted by the inputting unit.

The wireless communication unit 110 may perform a wireless communication with an external terminal or a server through a wireless communication network. The wireless communication may include an audio communication, a video communication, and a data communication. The wireless communication unit may transceive data by accessing a specific server. Here, each Uniform Resource Locator (URL) for displaying each position of files inside a plurality of serves is used. The URL may include the kind of a server to be accessed, a server position, a file position, etc. The URL may provide broadcasting information or URL information through the wireless communication unit.

The inputting unit 120 receives a user's voice input through a microphone, or receives a user's key input or a touch input through a key pad or a touch pad. Then, the inputting unit 120 generates a corresponding signal, and outputs the signal to the controller 160. In the present invention, the inputting unit receives broadcasting information or URL information.

The broadcasting signal receiving unit 140 receives a broadcasting signal in a satellite wave form or in a terrestrial wave form. The broadcasting signal may be at least one of a radio broadcasting signal, a TV broadcasting signal, and an Internet broadcasting signal. The broadcasting signal may include broadcasting information such as Electronic Service Guide (ESG), or URL information.

The memory 150 may store a user's interface program for receiving a broadcasting signal or for a URL access, a control program for controlling each operation of a mobile terminal, or data inputted/outputted to/from the mobile terminal. Especially, the memory may store status information that a broadcasting signal is not outputtable to a screen of the mobile terminal, and URL information of a web site (a specific server) that can be automatically accessed under the status.

The URL information may be implemented as substantial data of a broadcasting signal, or data relating to a broadcasting signal such as an ESG, or data such as a subtitle real time provided by being interworked with a broadcasting signal. The URL information may be received through a channel for transmitting a broadcasting signal received by the broadcasting signal receiving unit, or an additional channel for transmitting data relating to a broadcasting signal, or a data channel such as the Internet for transmitting a broadcasting signal through the wireless communication unit. The outputting unit 130 includes a speaker for outputting an audio signal received from an external terminal under control of the controller 160, or an audio signal generated when each function of the mobile terminal is performed. The outputting unit includes a display for displaying status information of the mobile terminal, and an image generated when each function of the mobile terminal is performed. The display may be a liquid crystal display (LCD), or organic light emitting diodes (OLED). The display may be implemented as a touch screen having an inputting function by touch together with an image outputting function.

The outputting unit 130 may display a broadcasting list received by the broadcasting signal receiving unit or the wireless communication unit, or a URL list relating to the broadcasting list. The broadcasting list indicates a channel list or a schedule list of each channel. When a user selects a specific broadcasting channel from the broadcasting list, the controller 160 receives a broadcasting signal of the selected broadcasting channel by controlling the broadcasting signal receiving unit 140, and outputs the broadcasting signal on a screen of the outputting unit 130.

The outputting unit 130 may divide the screen into a plurality of display regions so as to display a broadcasting list a broadcasting screen, a URL list, or a screen for an accessed URL.

When a status of the broadcasting screen is converted into an outputtable status from a non-outputtable status, the controller 160 may display a message that informs the broadcasting screen can be outputted, or an indicator by controlling the outputting unit 130. When the message or the indicator is displayed, sound may be outputted together therewith.

The URL information may be independently displayed from the broadcasting screen or the broadcasting list.

The controller 160 may access a broadcasting channel or a specific URL relating to a broadcasting signal by a user's selection by controlling the wireless communication unit 110 on a broadcasting list displayed through the outputting unit 130. When the selected broadcasting chapel is not outputted to the screen of the mobile terminal, the controller 160 may access a specific URL by referring to data stored in the memory 150. Herein, the data stored in the memory 150 includes status information that a broadcasting signal is not outputted, and URL information that can be automatically accessed in the status.

The controller 160 may divide a screen into a plurality of display regions, or may display the specific URL and the broadcasting list at different display regions by controlling the outputting unit 130. The URL may be displayed at a lower end of each item of the broadcasting list, or may be displayed at one side of the screen.

The controller 160 may measure a signal strength of a broadcasting signal received by the broadcasting signal receiving unit 140. When the broadcasting signal is received with a signal strength less than a predetermined value, or when the received broadcasting signal is not immediately outputted to the screen due to a hardware characteristic of the mobile terminal, the controller 160 automatically accesses a preset specific URL in correspondence to each status that the broadcasting screen is not outputted by controlling the wireless communication unit 110.

Herein, the URL list may be updated by being received with a predetermined period by a specific server, and the updated URL list may be stored in the memory 150. The mobile terminal may receive the updated URL list by requesting a specific server whenever outputting the broadcasting list.

When a user ends the URL access, the controller 160 may automatically re-enter a broadcasting mode by displaying a message for asking whether to enter a broadcasting mode and a menu for selecting various options on the outputting unit 130. The controller 160 may re-enter the broadcasting mode according to an option selected by a user. When the controller 160 re-enter the broadcasting mode, a broadcasting screen of a channel outputted before the URL access or a broadcasting list outputted before the URL access may be displayed. A method for displaying a message will be explained in more detail.

Hereinafter, a process for accessing a web site of the Internet according to the present invention will be explained with reference to FIG. 2.

Figure 2:
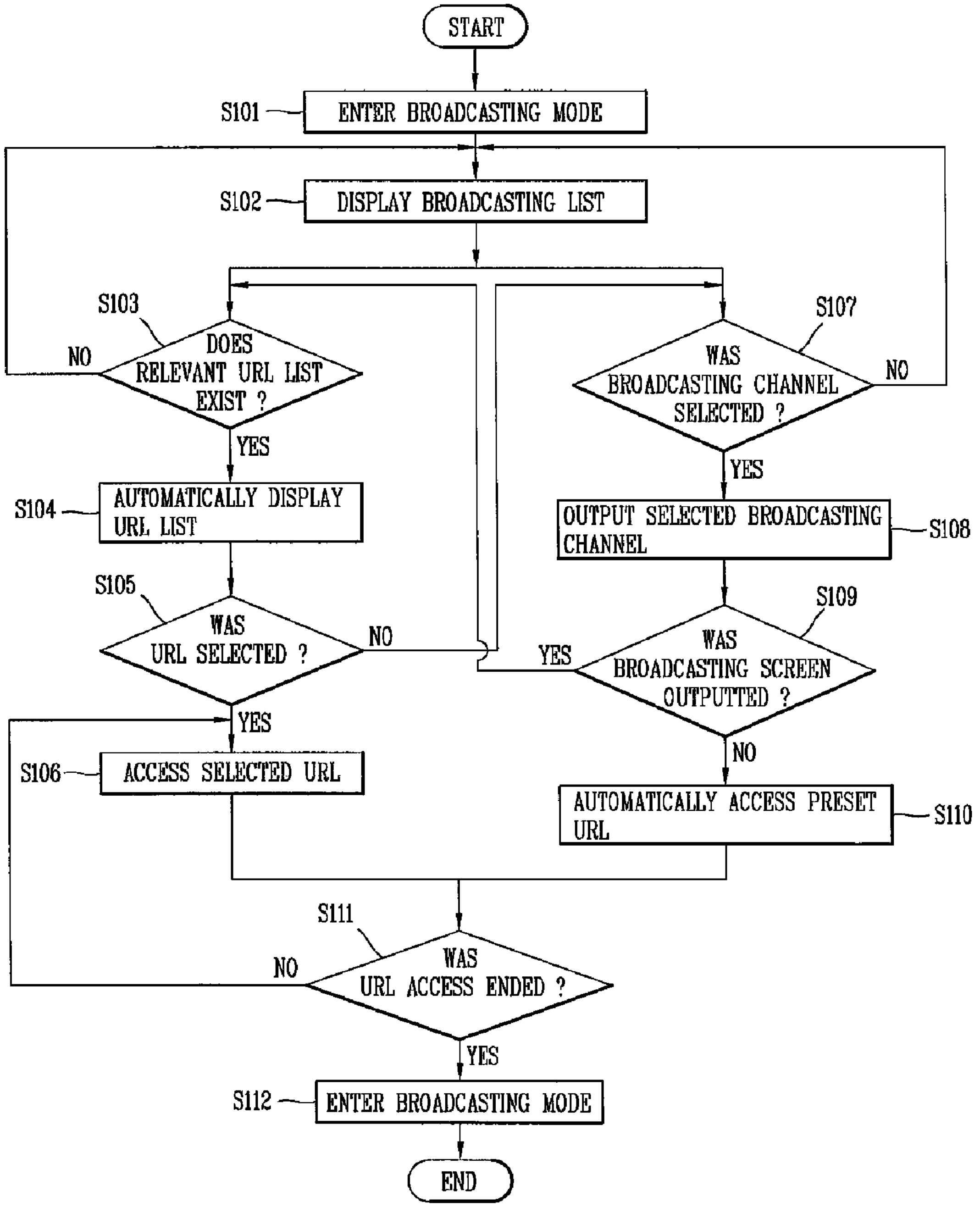
FIG. 2 is a flowchart showing processes for accessing a specific URL by a mobile terminal that is in a broadcasting made according to the present invention.

FIG. 2 is a flowchart showing processes for accessing a specific URL by a mobile terminal that is in a broadcasting mode according to the present invention.

Referring to FIG. 2, the mobile terminal 100 enters a broadcasting mode by a user's selection (S101).

The broadcasting mode is a mode for outputting at least one broadcasting signal received by the mobile terminal 100, and displays a channel list showing broadcasting channels such as CNN, BBC, and YTN, or a schedule list showing each program according to each hour of the broadcasting channel (S102). The broadcasting mode is differentiated from an Internet mode for firstly outputting an Internet browser and then accessing the Internet by inputting an address or through a bookmark. Hereinafter, the channel list and the schedule list will be abbreviated as a broadcasting list for convenience.

When a user selects his desired broadcasting channel or a broadcasting program in the broadcasting mode, the controller 160 receives a broadcasting signal of the selected broadcasting channel or the broadcasting program through the broadcasting signal receiving unit 140 (S107). Then, the controller 160 controls the broadcasting signal to be outputted on the screen (S108).

The mobile terminal 100 may display at least one URL information relating to a broadcasting channel or a broadcasting program in a form of a list (S103, S104).

The mobile terminal may directly access a web site (or the Internet server) of a specific URL regarding a broadcasting channel or a broadcasting program selected by a user in the broadcasting mode (S105, S106). That is, the mobile terminal may directly access the specific URL without converting the broadcasting mode into an internet mode.

Accordingly, time waste caused as the mobile terminal waits for a broadcasting screen to be displayed is prevented. Also, a user's inconvenience caused by converting the broadcasting mode to the Internet mode for the Internet access is prevented.

While a broadcast screen of a program selected by the user in the broadcasting mode is outputted, when a special situation that the broadcasting screen is not outputtable occurs, the mobile terminal 100 automatically accesses a preset URL (S109, S110). The specific URL may be a web site for providing information relating to a broadcasting channel being currently outputted, or may be a web site for providing information relating to a broadcasting channel to be outputted.

Hereinafter, a process for automatically accessing a preset URL in a broadcasting mode, and a process for accessing a specific URL by a user's selection will be explained.

A case that a broadcasting screen is not outputtable to the mobile terminal includes a case that a broadcasting screen is not outputted because a broadcasting signal is not received through the broadcasting signal receiving unit 140, a case that a broadcasting screen is not normally outputted since a broadcasting signal has been received with an signal strength lower than a predetermined value, or a case that a broadcasting signal is not outputted to the broadcasting screen due to a hardware characteristic of the mobile terminal.

Hereinafter, a process for automatically accessing a preset specific URL when the broadcasting screen is not outputted will be explained with reference to FIGS. 3A to 3F. The URL may be a web site or an address of a specific server that is accessible through wire/wireless network.

Figure 3A:
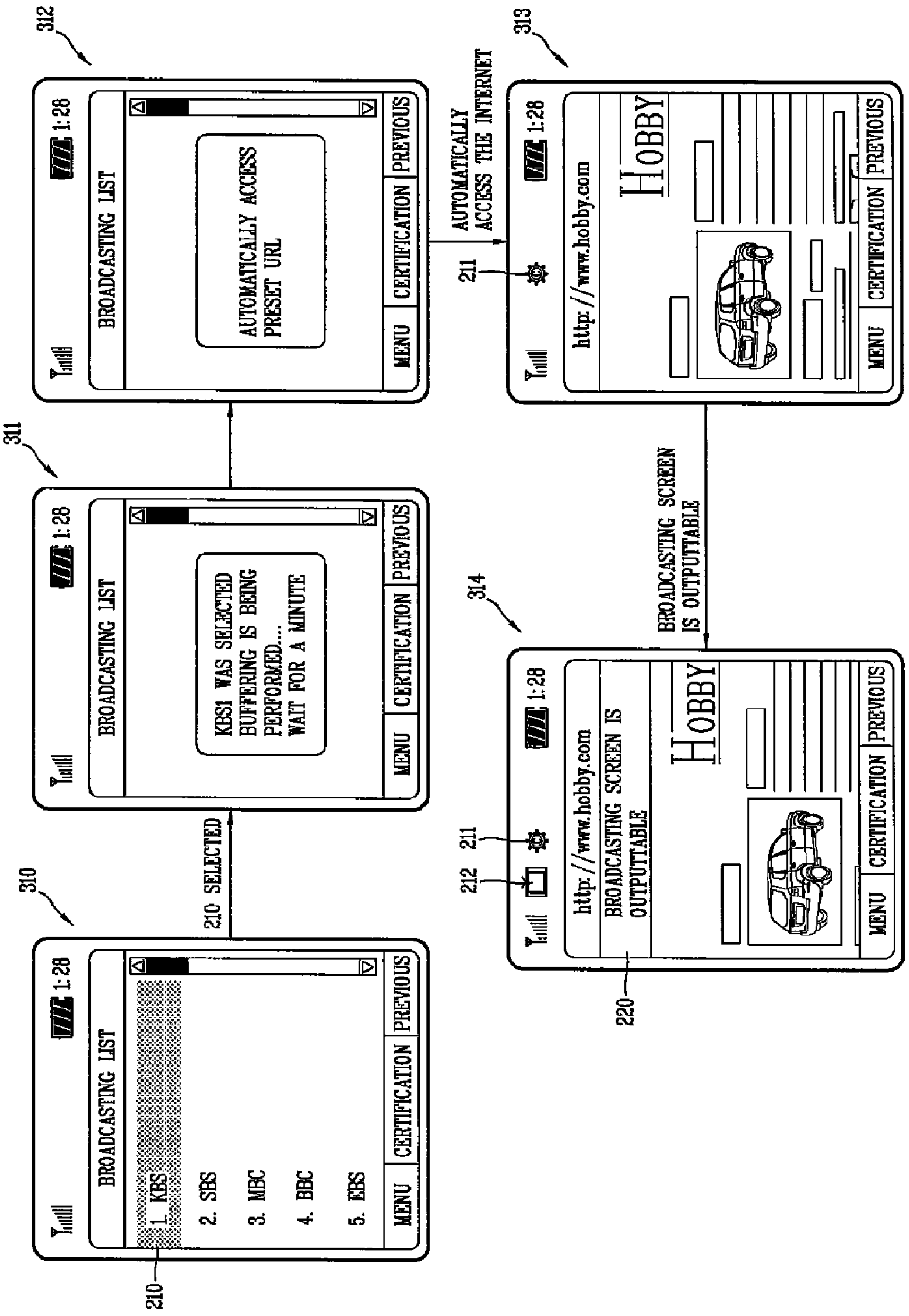
FIG. 3A is a first exemplary view showing a method for accessing the Internet when a broadcasting signal is not outputted in the broadcasting mode according to the present invention.

Referring to FIG. 3A, the mobile terminal 100 enters a broadcasting mode and then displays a broadcasting list on the outputting unit 130 (310). Then, the mobile terminal 100 receives a broadcasting signal of a broadcasting channel or a broadcasting program 210 selected by a user on the broadcasting list, thereby displaying the broadcasting signal on the outputting unit 130.

When the selected broadcasting channel is not immediately outputted to the screen but a predetermined waiting time is required due to a hardware characteristic of the mobile terminal (311), the controller 160 of the mobile terminal automatically accesses a preset specific URL relating to the current situation by referring to the memory 150 (313). Here, the controller 160 may display a message that informs a URL access on the outputting unit 130 (312). The mobile terminal may further display an indicator 211 that informs a URL access on the outputting unit 130 (313).

The specific URL may be a URL that provides a user's interest service.

For instance, the specific URL may include a URL that provides a news, a stock, an exchange rate, a hobby, and sports information. The specific URL may be directly set by a user through the inputting unit 120, or may be set by a broadcasting station as a default thus to be transmitted to the mobile terminal. Accordingly, the mobile terminal provides a menu for setting a function so that the user can directly set the URL.

The controller 160 of the mobile terminal 100 displays a message 220 or an indicator 212 for informing a user that a broadcasting screen is outputtable while the user surfs the Internet by accessing a URL (314). Here, the mobile terminal may output specific sound together with the message.

Figure 3B:
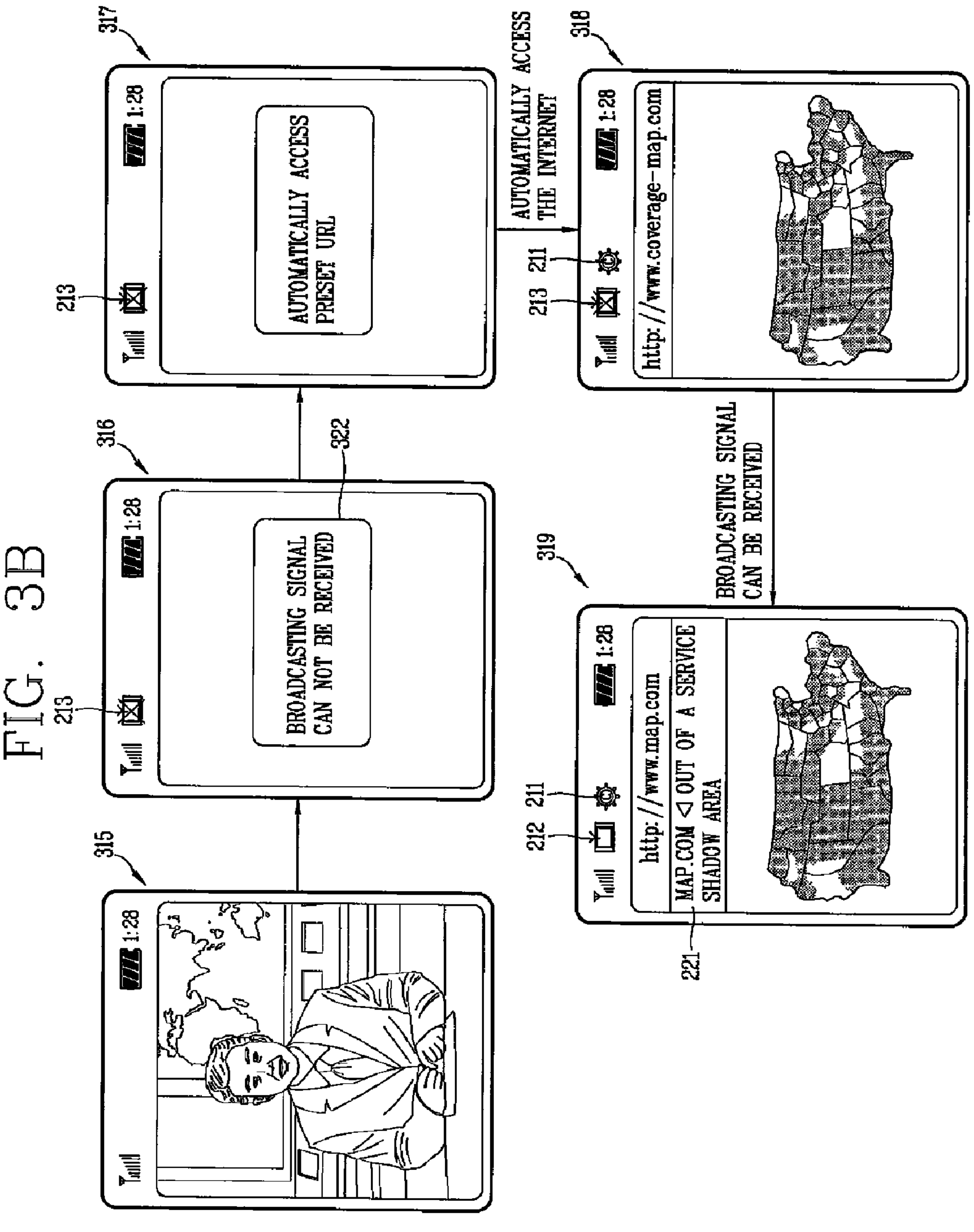
FIG. 3B is a second exemplary view showing a method for accessing the Internet when a broadcasting signal is not outputted in the broadcasting mode according to the present invention.

Referring to FIG. 3B, the mobile terminal 100 enters a broadcasting mode, and receives a broadcasting signal of a broadcasting channel selected by a user from a broadcasting list thus to display the broadcasting signal (315).

When the mobile terminal enters a service shadow area thus not to output a broadcasting screen any longer, the controller 160 controls the mobile terminal to automatically access a preset specific URL relating to the current situation by referring to the memory 150. The outputting unit 130 may output a message for informing that a broadcasting is not outputtable any longer since the mobile terminal has entered the service shadow area with an indicator 213 (316), or may output a message for informing that the mobile terminal accesses a preset URL (317).

When a detected signal strength of a received broadcasting signal is less than a predetermined value, the mobile terminal is judged to have entered the service shadow area.

The specific URL includes a URL that provides a service relating to a service shadow area.

For instance, the specific URL may include a URL of a web site that provides a coverage map (318). The specific URL may be directly set by a user, or may be set as a default value by a specific server thus to be transmitted to the mobile terminal.

The controller 160 of the mobile terminal 100 displays a message 221 or an indicator 212 for informing a user that a broadcasting screen is outputtable while the user sods the Internet by accessing a URL (319).

Figure 3C:
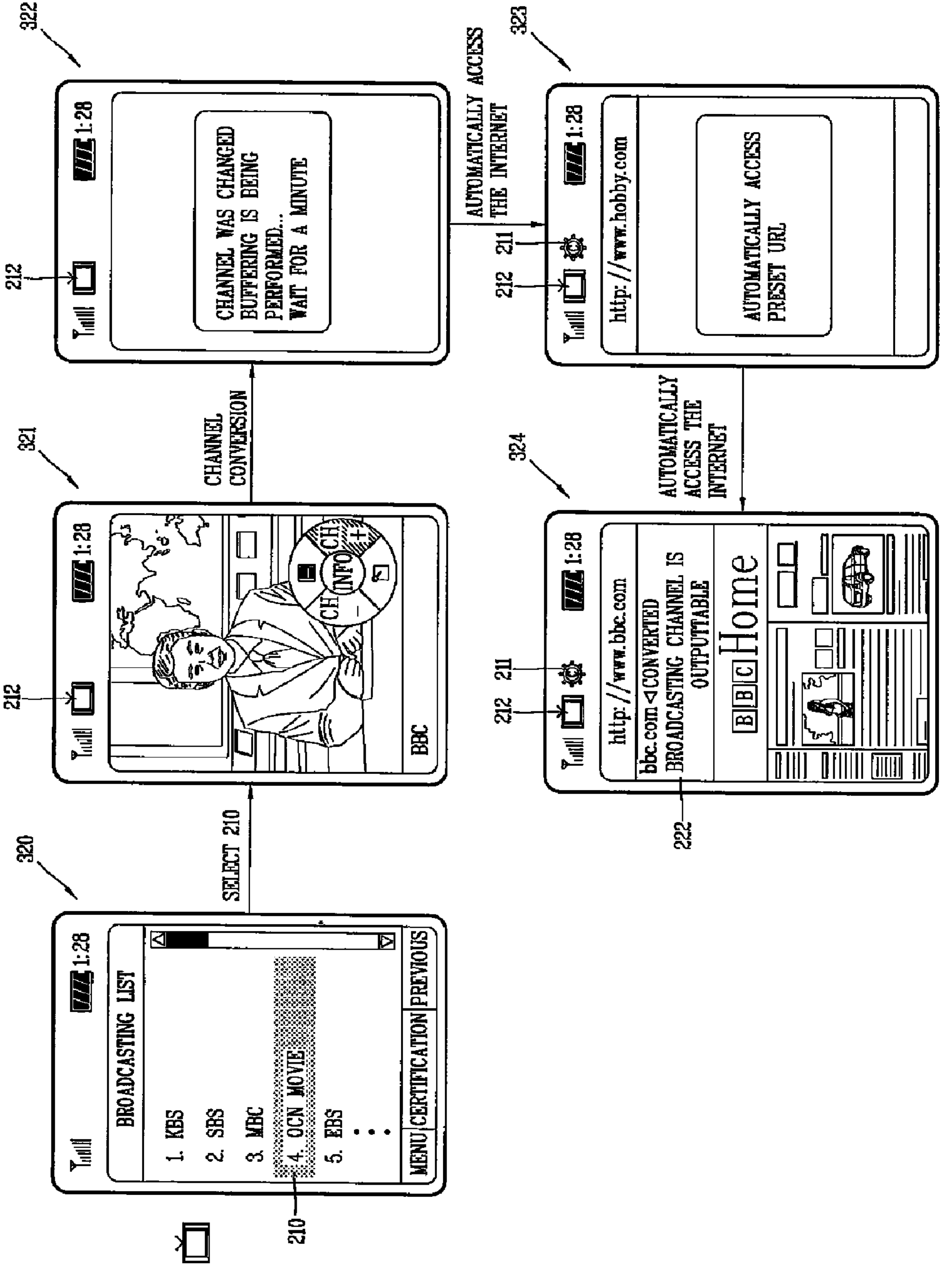
FIG. 3C is a third exemplary view showing a method for accessing the Internet when a broadcasting signal is not outputted in the broadcasting mode according to the present invention.

Referring to FIG. 3C, the mobile terminal 100 enters a broadcasting mode thus to display a broadcasting list (320), and receives a broadcasting signal of a broadcasting channel or a broadcasting program selected by a user from a broadcasting list thus to display the broadcasting signal on the screen (321).

When a user is to convert the current broadcasting channel into a new broadcasting channel on a broadcasting screen being outputted, the new broadcasting channel is not immediately outputted to the broadcasting screen but a predetermined time is required due to a hardware characteristic of the mobile terminal (322). Here, the controller 160 of the mobile terminal automatically accesses a preset specific URL relating to the current situation by referring to the memory 150 (324).

Here, the controller 160 may display a message 222 that informs a URL access on the outputting unit 130 (323).

The specific URL may be a URL that provides information relating to the current broadcasting channel, or may be a URL that provides information relating to a new broadcasting channel. The controller 160 of the mobile terminal 100 displays a message 222 or an indicator 212 for informing a user that the broadcasting screen is outputtable while the user surfs the Internet by accessing a URL (319).

Figure 3D:
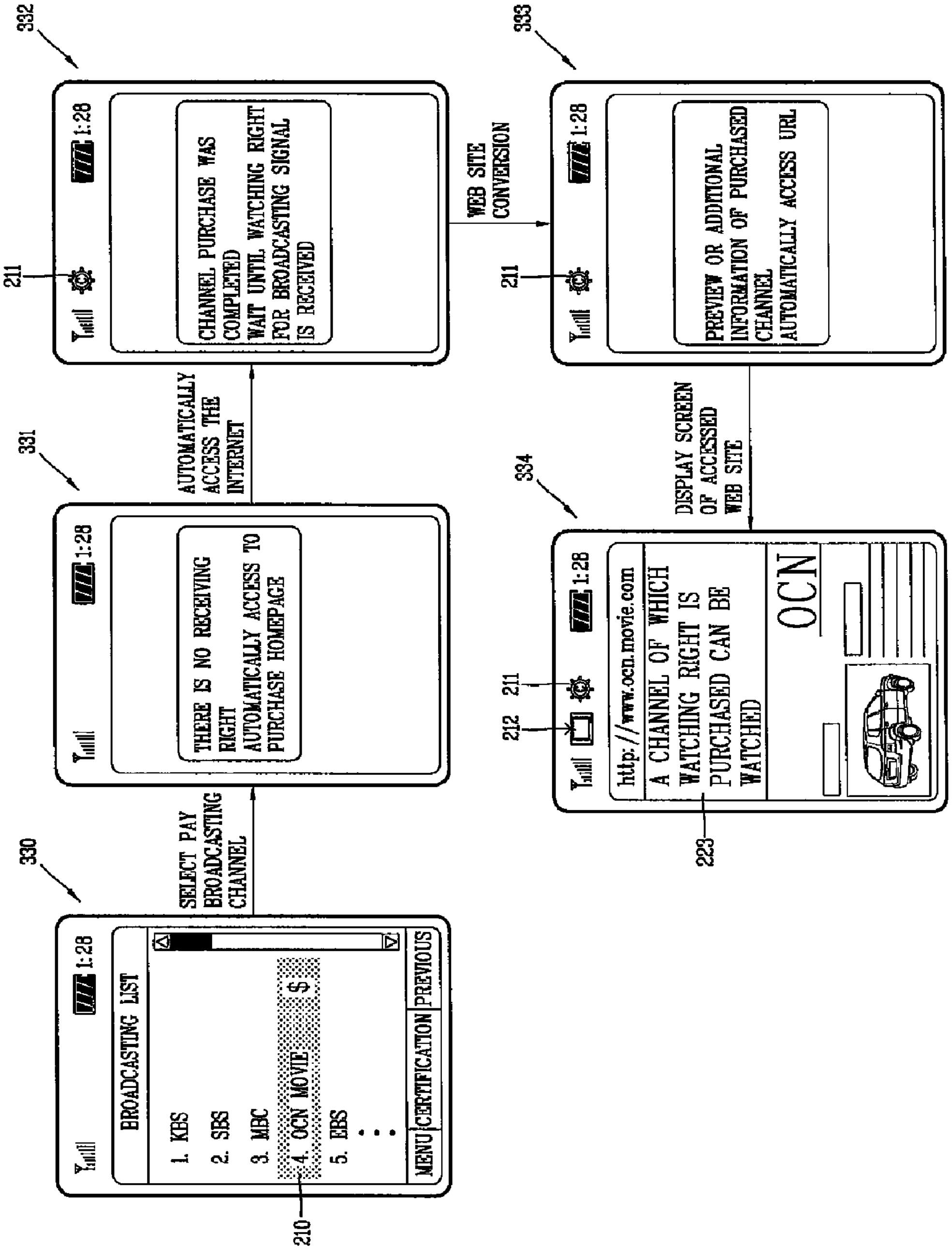
FIG. 3D is a fourth exemplary view showing a method for accessing the Internet when a broadcasting signal is not outputted in the broadcasting mode according to the present invention.

Referring to FIG. 3D, the mobile terminal 100 enters a broadcasting mode thus to display a broadcasting list (330), and receives a broadcasting signal of a broadcasting channel or a broadcasting program selected by a user from a broadcasting list thus to display the broadcasting signal on the screen (321). However, when a broadcasting channel selected by a user from the broadcasting list is a pay broadcasting channel (e.g., OCN MOVIE), if the user does not have a receiving right (or a viewing right), the user can not watch the selected broadcasting channel.

The controller 160 of the mobile terminal 100 judges whether each broadcasting channel is a pay broadcasting channel or a free broadcasting channel by checking additional information from the broadcasting list. When the broadcasting channel is a pay broadcasting channel, the controller 160 may display an indicator for informing the status. The indicator may be implemented as at least one of an image, a graphic, an icon (e.g., $, \), an animation, and a text. In order to separate a pay broadcasting channel and a free broadcasting channel from each other, a background color or a font color may be differently displayed.

When the user selects a pay broadcasting channel, the controller 160 may display a message for informing whether the user can have a viewing right for the selected broadcasting channel on the outputting unit 130 (331).

When the user selects a pay broadcasting channel, the controller 160 automatically accesses a specific URL that a viewing right for the pay broadcasting channel can be purchased. The specific URL may be a web site that provides a member subscription service or a pay service.

When the user completes a purchase for the pay broadcasting channel by accessing the URL, if the controller 160 has to wait until an Entitlement Management Message (EMM) including a viewing right for the pay broadcasting channel is received, the controller 160 may access a URL that provides preview or additional information relating to the purchased broadcasting channel (334). Here, the controller 160 may output a message relating to each step currently being performed on the outputting unit 130 (331~333).

The time during which the controller 160 waits may depend on a receiving period for the EMM.

The controller 160 judges whether the EMM is received while the user surfs the Internet on the accessed URL. If the EMM is received, the controller 160 displays a message 323 or an indicator 212 for informing that a corresponding pay broadcasting channel is outputtable on the displaying unit 130.

Figure 3E:
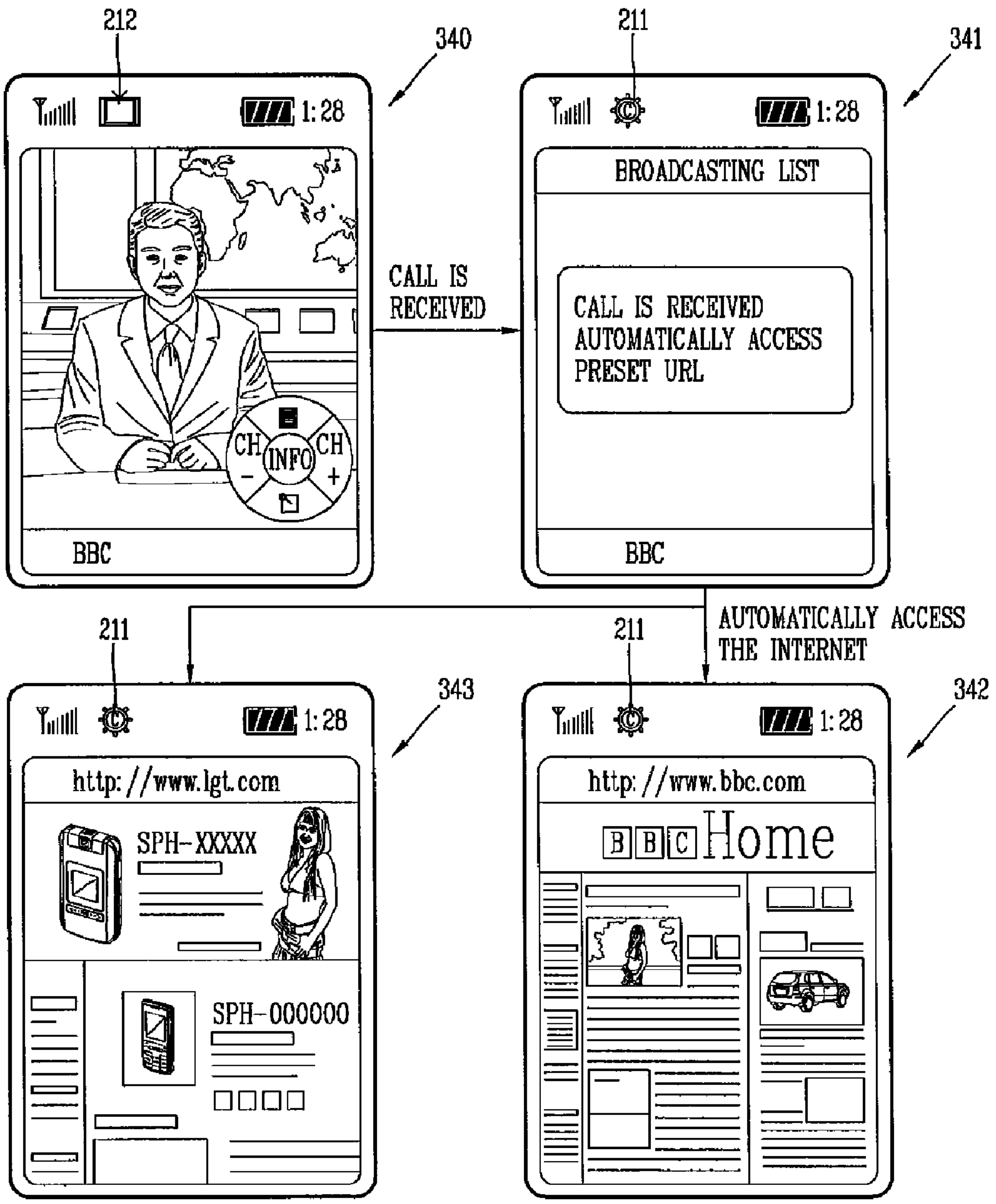
FIG. 3E is a fifth exemplary view showing a method for accessing the Internet when a broadcasting signal is not implemented in the broadcasting mode according to the present invention.

Referring to FIG. 3E, the mobile terminal 100 enters a broadcasting mode, and receives a broadcasting signal of a broadcasting channel selected by a user from a broadcasting list thus to display the broadcasting signal on the screen (340). If an external call is received while the broadcasting screen is outputted (341), the controller 160 may access a preset specific URL relating to the current situation by referring to the memory 150 (342, 343).

The specific URL may be a URL that provides a Speech To Text (STT) service (342). Since the mobile terminal outputs only a video signal not an audio signal while receiving a call, the user may use a web site that implements an audio service into a text service.

The specific URL may be a URL that provides a web site relating to a telephone charging or additional service, or may be a URL that provides a user's preset interest information (343). Since two operations (e.g., a calling and the Internet surfing) are not simultaneously performed during a calling, the specific URL allows the user to automatically access a web site that can not be frequently accessed due to a time limitation, thereby allowing the user to search necessary information.

When the user ends the calling or the URL access, the mobile terminal automatically re-enters the broadcasting mode.

Figure 3F:
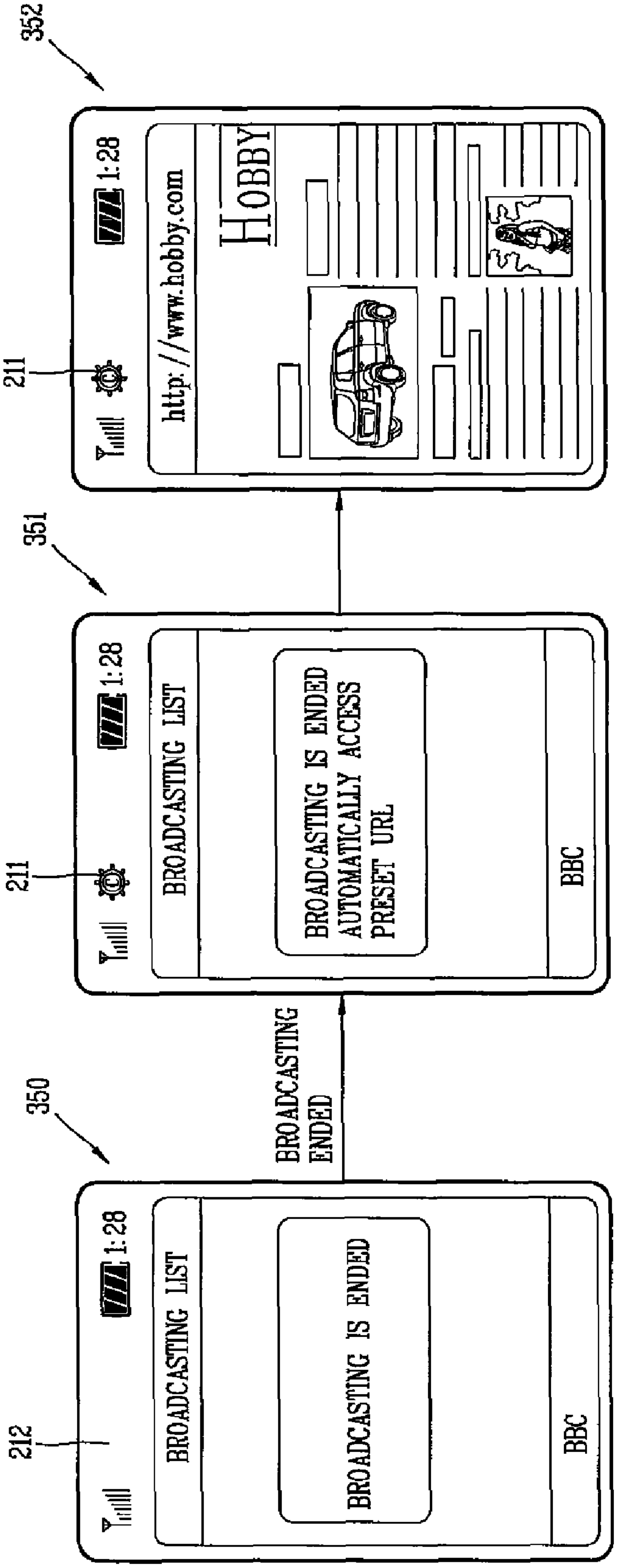
FIG. 3F is a sixth exemplary view showing a method for accessing the Internet when a broadcasting signal is not outputted in the broadcasting mode according to the present invention.

Referring to FIG. 3F, when the user ends the broadcasting mode of the mobile terminal 100 (350), the controller 160 may automatically access a specific URL relating to the current situation and pre-stored in the memory 150 (352). Here, the controller 160 may output a message 351 that informs a URL access to the outputting unit 130 (351).

The specific URL may be a URL that provides a service for a preview program relating to a broadcasting channel being outputted before the broadcasting screen is ended, or may be a URL that provides a user's interest information such as a schedule, a weather, and a sports.

Referring to FIG. 2, when the user who is surfing the Internet by accessing the URL in FIGS. 3A to 3E ends the URL access after the message or indicator informing that a broadcasting screen is outputtable is displayed, the mobile terminal may automatically re-enter the broadcasting mode (S111, S112).

In order for the mobile terms to re-enter the broadcasting mode, the controller 160 outputs a message that informs whether to enter the broadcasting mode and a section menu to the outputting unit 130. The mobile terminal may re-enter the broadcasting mode according to the user's selection. Once the mobile terminal re-enters the broadcasting mode, the controller 160 may re-receive a broadcasting signal of a broadcasting channel being outputted before the URL access and then display the broadcasting signal, or may output a broadcasting list being outputted before the URL access.

Hereinafter, a process for entering the broadcasting mode by the mobile terminal when the URL access is ended will be explained in more detail with reference to FIGS. 4A and 4B.

Figure 4A:
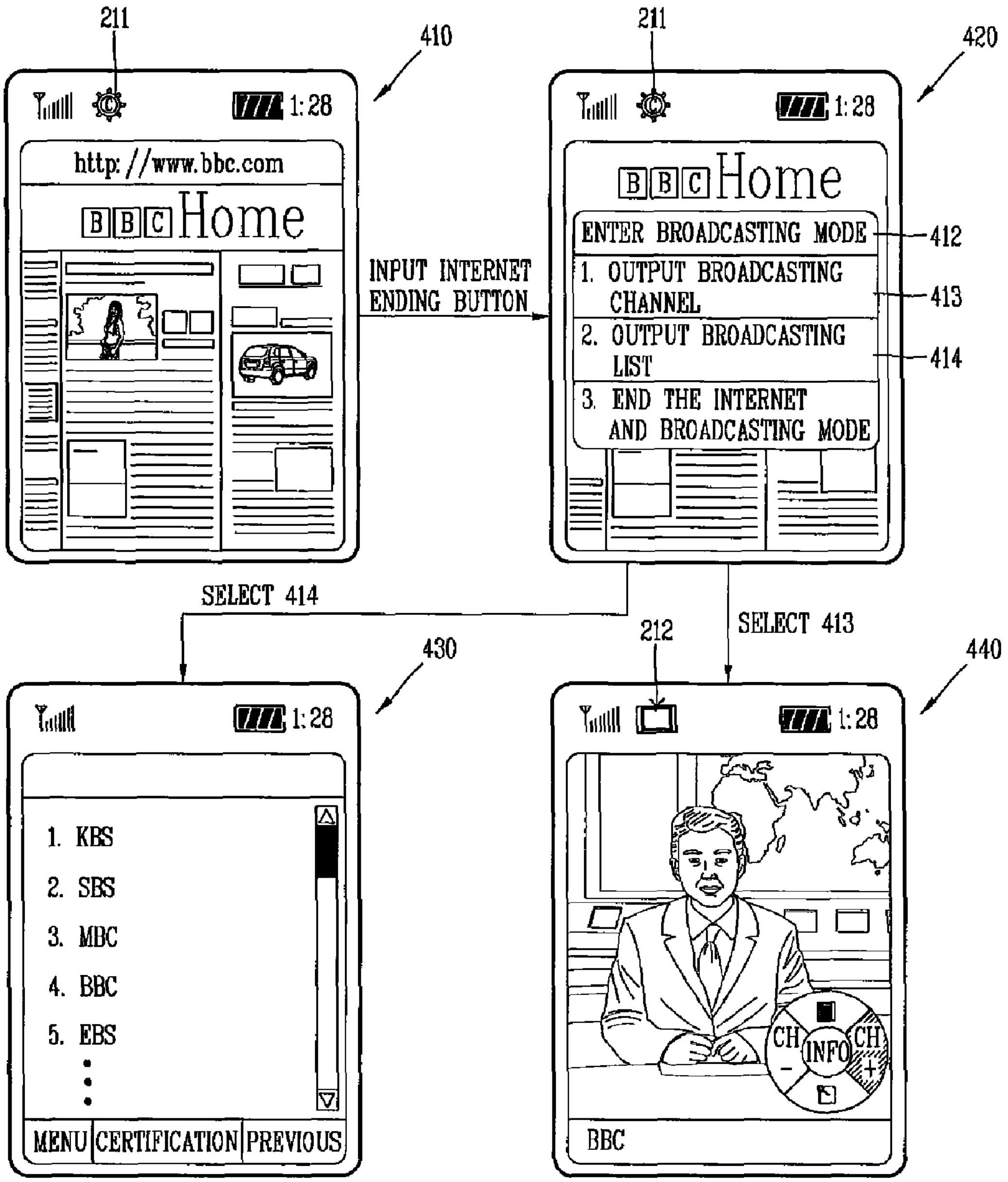
FIG. 4A is a first exemplary view showing a method for entering a broadcasting mode when the Internet access is ended according to the present invention.

Referring to FIG. 4A, when the user ends the current URL 410, the controller 160 outputs a selection menu 412 having various options for re-entering the broadcasting mode to the outputting unit 130. For instance, the controller 160 may allow the user to select one of whether to output a broadcasting screen of a broadcasting channel being outputted before the URL access when the mobile terminal reenters the broadcasting mode (413), whether to output a broadcasting list (414), and whether to directly end the URL access without re-entering the broadcasting mode.

The selection menu may be outputted in a pop-up manner.

According to the user's selection for the selection menu 412, a broadcasting list may be displayed (430), or a broadcasting screen for receiving a broadcasting signal may be displayed (440).

Figure 4B:
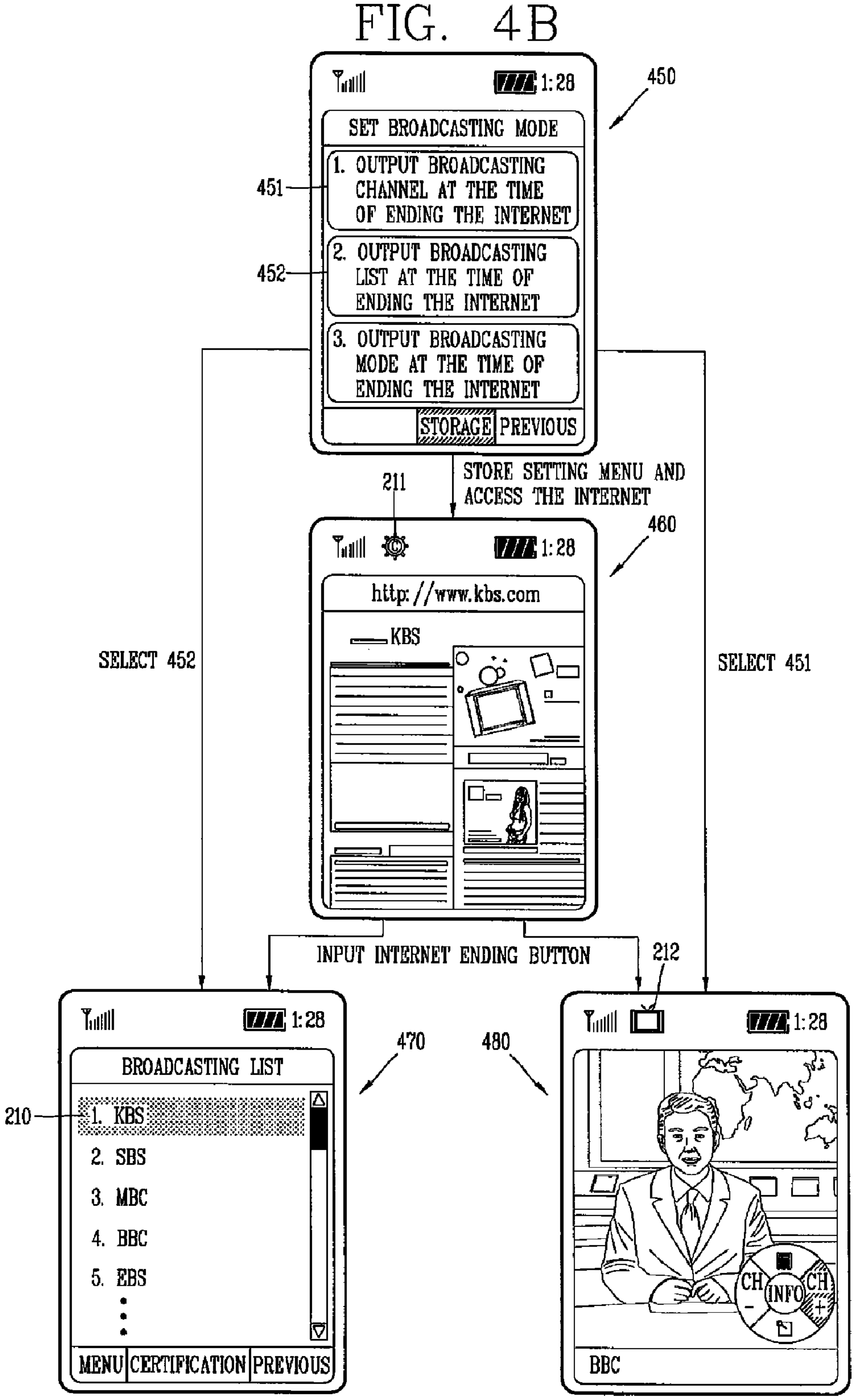
FIG. 4B is a second exemplary view showing a method for entering a broadcasting mode when the Internet access is ended according to the present invention.

As shown in FIG. 4B, when the user ends the URL access 460, the controller 160 may automatically re-enter the broadcasting mode without outputting the option menu 412 by referring to a value preset in the memory 150. Then, the controller 160 may continue to output a broadcasting screen 480 of a broadcasting channel being currently outputted, or may output a broadcasting list 470.

Accordingly, the mobile terminal may be provided with a setting menu for setting a method to enter a broadcasting mode when the URL access is ended, or may store a setting value preset in the memory 150 (450).

A process for accessing a specific URL by a user's selection on a broadcasting list will be explained with reference to FIGS. 5A to 5C.

The mobile terminal 100 enters a broadcasting mode by a user's selection.

The mobile terminal may output a broadcasting list on a broadcasting screen thus to allow a user to select his desired channel, or may automatically output a broadcasting screen of a channel that was being watched by a user.

The controller 160 judges whether a URL relating to a broadcasting channel exists in the broadcasting mode, and if so, displays the URL on the broadcasting list or at one side of the broadcasting screen.

Accordingly, the user may directly access a selected specific URL relating to each broadcasting channel of the broadcasting list. That is, the user may select a specific broadcasting channel in the broadcasting mode, and then directly access a specific URL relating to the broadcasting channel before a broadcasting screen is outputted.

Figure 5A:
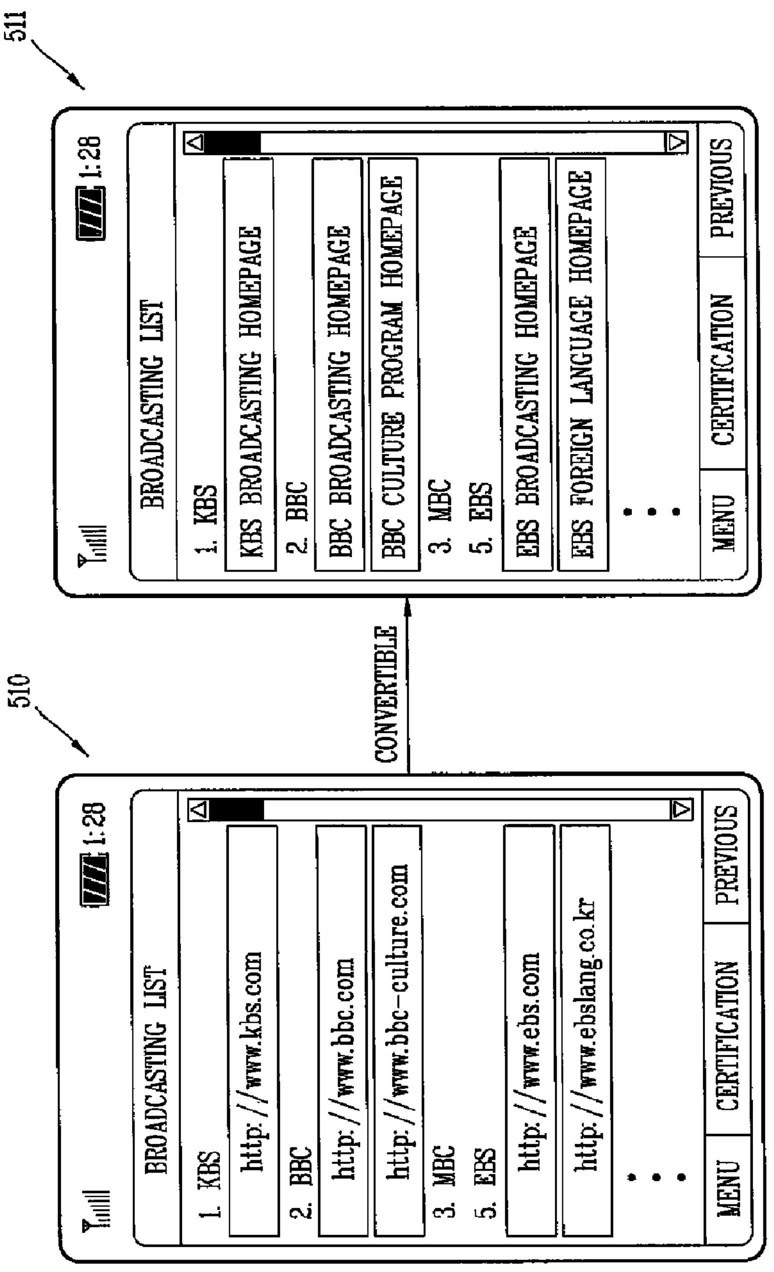
FIG. 5A is a first exemplary view showing a method for displaying a URL list relating to each channel of a broadcasting list according to the present invention.

As shown in FIG. 5A, one or more specific URLs relating to a broadcasting channel may be displayed at a lower end of each broadcasting channel of a broadcasting list (510). Here, not the specific URL but summary information regarding the specific URL may be displayed (511). The specific URL and the summary information regarding the specific URL may be set by a user, or may be set as a default value by a specific server thus to be transmitted to the mobile terminal.

Figure 5B:
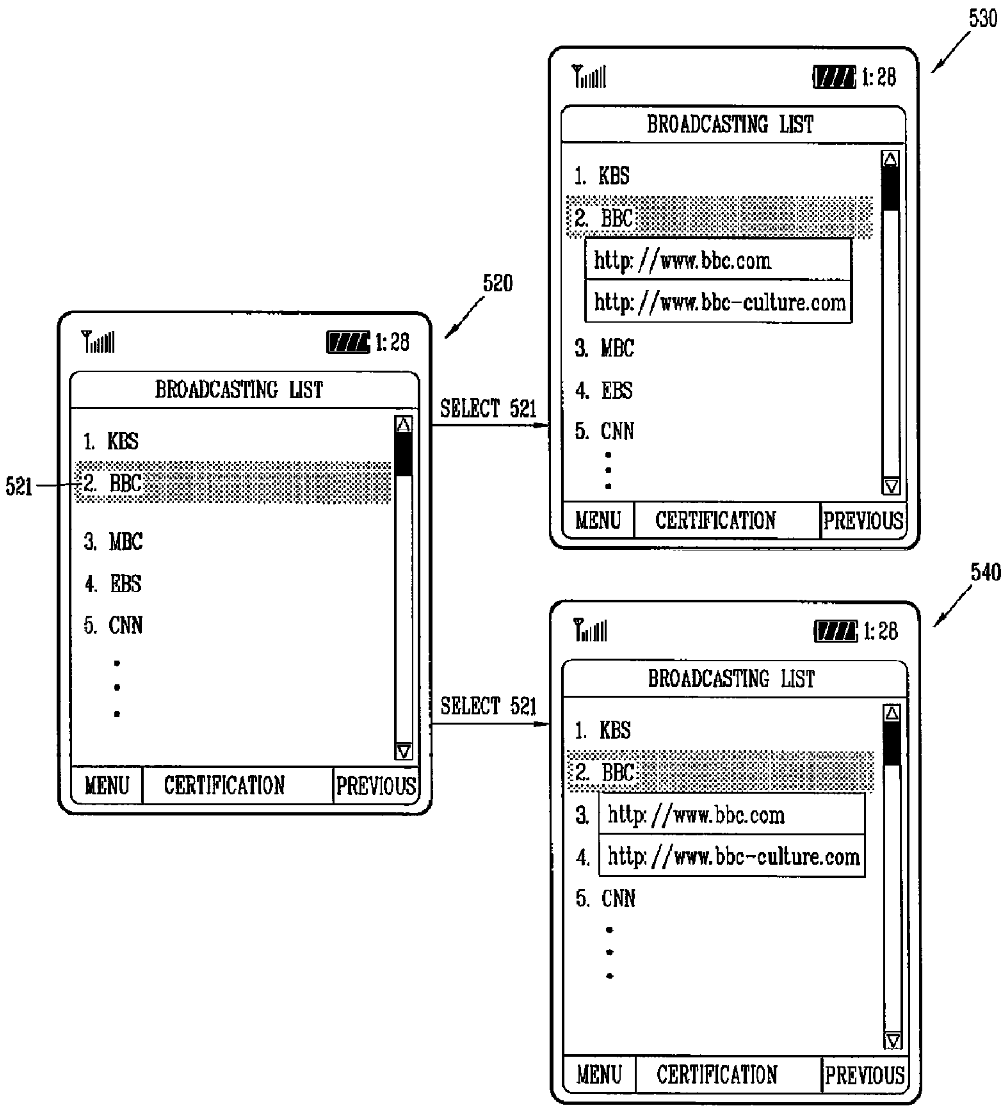
FIG. 5B is a second exemplary view showing a method for displaying a URL list relating to each channel of a broadcasting list according to the present invention.

As shown in FIG. 5B, when a specific broadcasting channel 521 is outputted to a broadcasting screen 520, the URL list may be displayed at an empty space formed by downwardly shifting other broadcasting channels rather than the selected broadcasting channel (530), or may be displayed in an overlay manner on the existing broadcasting list when there is no empty space to display the URL list (540).

Figure 5C:
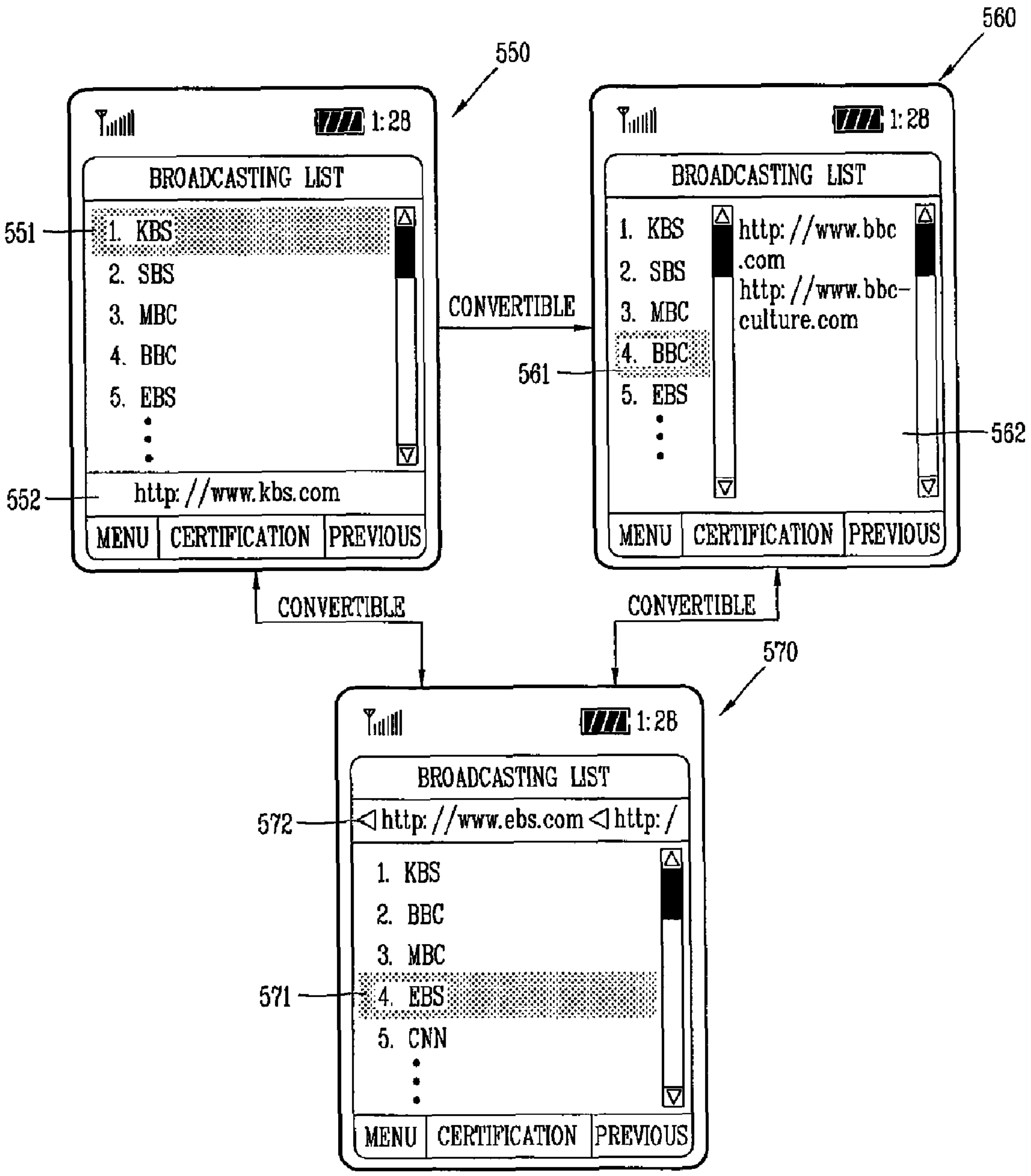
FIG. 5C is a third exemplary view showing a method for displaying a URL list relating to each channel of a broadcasting list according to the present invention.

As shown in FIG. 5C, an additional window for displaying a URL (a URL window) may be displayed at a lower portion of the broadcasting screen (550). The URL window may be displayed at an upper portion of the broadcasting screen (570), or may be displayed at a side portion of the broadcasting screen (560). For instance, when predetermined broadcasting channels 551, 561, and 571 are selected from the broadcasting list, URLs relating to the selected broadcasting channels are displayed at URL windows 552, 562, and 572.

The URL may be displayed as at least one of a full address, an icon, a banner, a server name, and summary information. The icon and the banner may be respectively displayed as one of a still image, a moving image, and a graphic.

When a broadcasting channel is selected from the broadcasting list, the controller 160 judges whether a URL relating to the selected broadcasting channel exists. If there is a URL relating to the selected broadcasting channel, a URL list is displayed. It may be also judged whether each broadcasting channel has a corresponding URL, and each URL may be displayed on each screen of the broadcasting channels. A display format of the URL list being displayed may be changed by a user.

Figure 6:
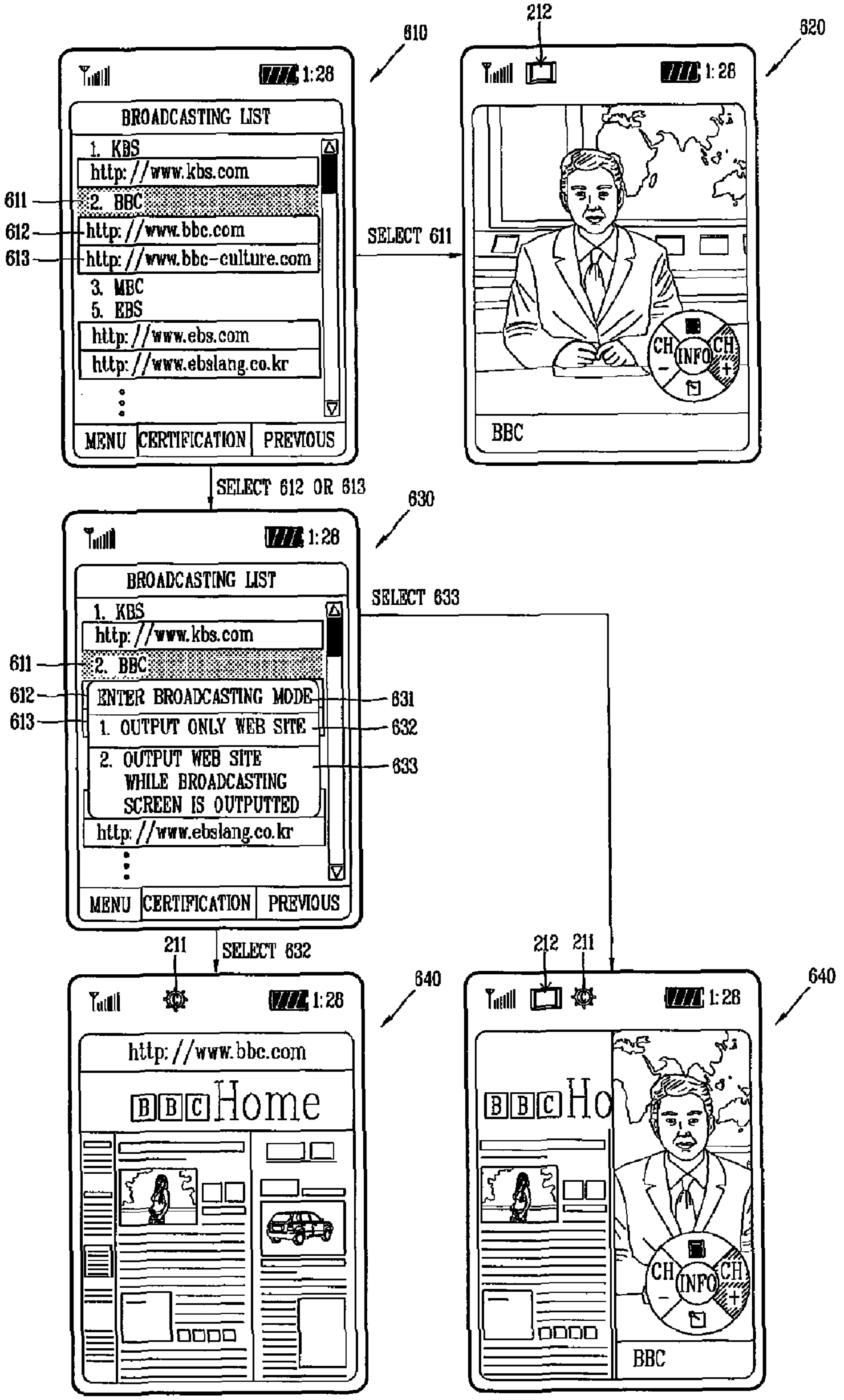
FIG. 6 is an exemplary view showing a broadcasting screen or a URL screen when a broadcasting channel or a URL is selected according to the present invention.

Referring to FIG. 6, when a specific broadcasting channel 611 or URLs 612 and 613 are selected from a broadcasting list 610 by a user, a broadcasting screen 620 of the selected broadcasting channel or a URL screen 640 of the selected broadcasting channel may be displayed.

The controller 160 may divide a screen of the outputting unit 130 into a plurality of display regions, and display a broadcasting screen and a URL screen on the screen (650). The mobile terminal may be provided with an additional setting menu thus to preset a method for displaying the screen. The divided size of the screen may be later changed by a user.

When one of a plurality of URLs relating to the broadcasting channel is selected, the controller 160 displays a selection menu 631 on the outputting unit 130 (630). For instance, when a specific broadcasting channel 611 is selected from the broadcasting list 610, only a broadcasting screen is outputted (620). When URLs 612 and 613 relating to the broadcasting channel are selected, the selection menu 631 for displaying the screen is outputted. The selection screen 631 includes an option for selecting an output of only the website 632 and an option for selecting an output of the website while the broadcasting screen is outputted 633, and then only the URL screen 640 may be outputted by a user's selection, or both the broadcasting screen and the URL screen may be outputted (650), respectively.

Figure 7A:
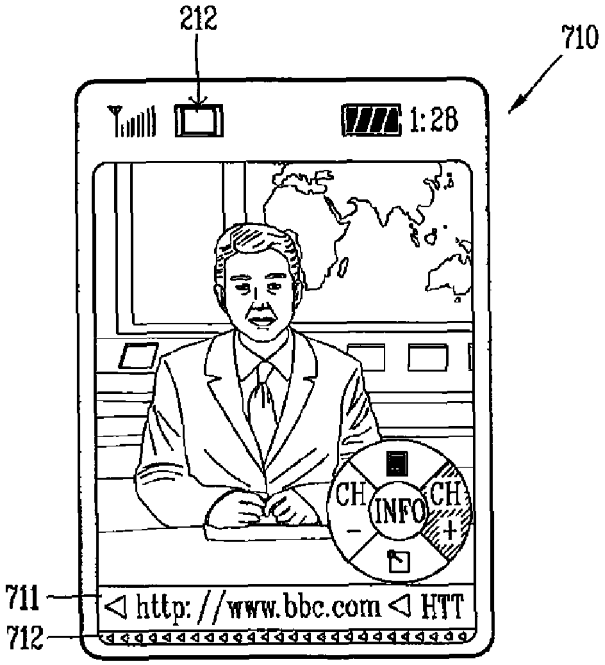
FIG. 7A is an exemplary view showing a method for displaying URLs relating to each broadcasting channel by scrolling in right and left directions.
Figure 7B:
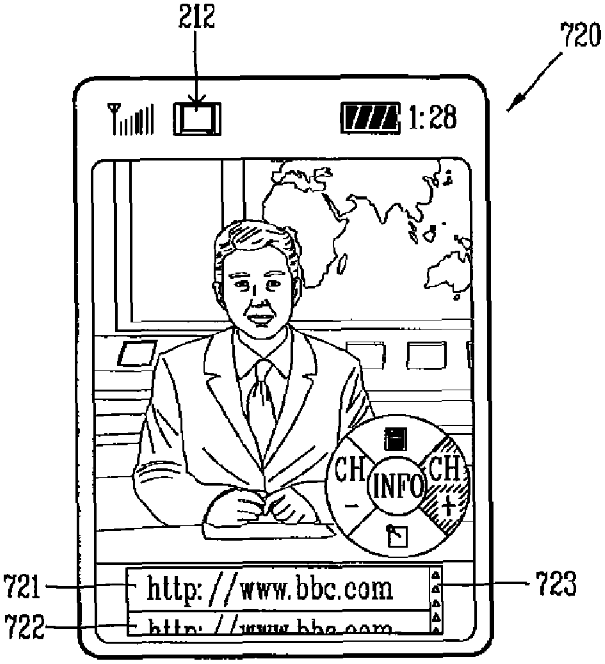
FIG. 7B is an exemplary view showing a method for displaying URLs relating to each broadcasting channel by scrolling in upper and lower directions.

As shown in FIGS. 7A and 7B, while a broadcasting screen is being outputted to the mobile terminal, URLs 711 and 721 relating to the broadcasting screen may be displayed at a portion of the broadcasting screen (e.g., an upper portion, a middle portion, or a lower portion) in an overlay manner.

When two or more URLs exist, the controller 160 may display the URLs by automatically performing a scrolling process. The scrolling process may be performed from the left to the right, or from the right to the left on the screen (710). The scrolling process may be also performed from the upper to the lower, or from the lower to the upper on the screen (720).

A direction of the scrolling may be displayed by indicators 712 and 723, and a status of the scrolling may be displayed in a form of an animation. Whenever each URL is displayed, the scrolling is stopped for a predetermined time so as to enable a user to select the displayed URL.

When a first URL is displayed to disappear in a fade in/out manner, a second URL is displayed to disappear at the same position. This process is repeated by the number of the URL.

Each URL has a corresponding number, so that a user can easily select the URL by using a button on a key pad.

The present invention has the following advantages.

When a broadcasting signal is not received, or when a received broadcasting signal is not immediately outputted to the screen thus to require a waiting time, the mobile terminal can automatically access a preset specific URL.

Furthermore, the mobile terminal can immediately access a URL relating to each broadcasting channel from a broadcasting list in a broadcasting mode without converting the broadcasting mode into an Internet mode.

Also, when a URL access is to be ended in a broadcasting mode, a broadcasting screen being outputted before the URL access can be displayed without performing an additional process for entering the broadcasting mode.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 160.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory 150), and executed by a controller or processor (for example, controller 160).

Examples of air interfaces used by the broadcasting signal receiving unit 140 include frequency division multiple access (FDMA), time division multiple access (TDMA), code division multiple access (CDMA), and universal mobile telecommunications system (UMTS), the long term evolution (LTE) of the UMTS, and the global system for mobile communications (GSM).

The memory 150 shown in FIG. 1 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The foregoing embodiments and advantages are merely exemplary and are not to be construed as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A Uniform Resource Locator (URL) access method for a mobile terminal, comprising:

entering a broadcasting mode and selecting a broadcasting channel, the broadcasting channel being one of a radio broadcasting channel, a TV broadcasting channel, and a wired or wireless network broadcasting channel;

receiving a broadcasting signal of the broadcasting channel;

outputting the broadcasting signal to a screen of the mobile terminal;

automatically accessing a specific URL and displaying information relating to the specific URL during a time awaiting a display of a broadcasting screen when the broadcasting screen of the selected broadcasting channel is not immediately displayed;

displaying the accessed specific URL or both the broadcasting signal and the accessed specific URL in a divided screen according to a user's selection if the specific URL related to the broadcasting signal is selected while the broadcasting signal is outputted; and automatically accessing a speech to text service (STT) service for implementing an audio data into a text data if an external call is received while the broadcasting screen is outputted.

2. The method of claim 1, wherein the specific URL is a web site or an address of a specific server.

3. The method of claim 1, wherein the specific URL is preset by a user via a user interface, or is a preset default value.

4. The method of claim 1, wherein the specific URL is updated periodically or by a user's selection.

5. The method of claim 1, wherein the specific URL comprises at least one of:

a URL selected by a user;

a URL relating to the broadcasting channel;

a URL providing information relating to a purchase of a pay broadcasting channel; and a URL providing an additional broadcasting service or identifying a service allowable range.

6. The method of claim 1, wherein the waiting time comprises at least one of a time before a selected channel is displayed on the screen;

a time before a converted broadcasting channel is displayed on the screen;

a time that a broadcasting signal is not received, or a time that the mobile terminal has entered a service shadow area where a broadcasting signal strength is less than a predetermined value;

a time that a viewing right of a pay broadcasting channel is not purchased, or a time that a purchased viewing right is not received; and a time receiving a call.

7. The method of claim 1, further comprising:

when a broadcasting screen is outputtable during the URL access, displaying at least one of a message or an indicator to inform a user that the broadcasting screen is outputtable.

8. The method of claim 1, further comprising:

when the URL access is ended, when the broadcasting screen is outputtable, or when a user selects to end the URL access, automatically re-entering the broadcasting mode according to a preset condition.

9. A mobile terminal having a URL access function, comprising:

a receiving unit configured to receive a broadcasting signal;

a display;

an inputting unit; and a controller configured to control the receiving unit and display in response to a command, the controller configured to cause the mobile terminal to perform the following functions:

enter a broadcasting mode and select a broadcasting channel, the broadcasting channel being one of a radio broadcasting channel, a TV broadcasting channel, and a wired or wireless network broadcasting channel;

receive a broadcasting signal of the broadcasting channel;

output the broadcasting signal to a screen of the display;

automatically access a specific URL and display information relating to the specific URL during a time awaiting a display of a broadcasting screen when the broadcasting screen of the selected broadcasting channel is not immediately displayed;

display the accessed specific URL or both the broadcasting signal and the specific URL in a divided screen according to a user's selection if the specific URL related to the broadcasting signal is selected while the broadcasting signal is outputted; and automatically access a speech to text service (STT) service for implementing an audio data into a text data if an external call is received while the broadcasting signal is outputted.

10. The mobile terminal of claim 9, wherein the specific URL is a web site or an address of a specific server.

11. The mobile terminal of claim 9, wherein the specific URL is preset by a user via a user interface, or is a preset default value.

12. The mobile terminal of claim 9, wherein the specific URL is updated periodically or by a user's selection.

13. The mobile terminal of claim 9, wherein the specific URL comprises at least one of:

a URL selected by a user;

a URL relating to the broadcasting channel;

a URL providing information relating to a purchase of a pay broadcasting channel; and a URL providing an additional broadcasting service or identifying a service allowable range.

14. The mobile terminal of claim 9, wherein the waiting time comprises at least one of:

a time before a selected channel is displayed on the screen;

a time before a converted broadcasting channel is displayed on the screen;

a time that a broadcasting signal is not received, or a time that the mobile terminal has entered a service shadow area where a broadcasting signal strength is less than a predetermined value;

a time that a viewing right of a pay broadcasting channel is not purchased, or a time that a purchased viewing right is not received; and a time receiving a call.

15. The mobile terminal of claim 9, wherein the controller is configured to cause the mobile terminal to perform the following function:

display at least one of a message or an indicator to inform a user that the broadcasting screen is outputtable when the broadcasting screen is outputtable during the URL access.

16. The mobile terminal of claim 9, wherein the controller is configured to cause the mobile terminal to perform the following function:

automatically re-enter the broadcasting mode according to a preset condition when the URL access is ended, when the broadcasting screen is outputtable, or when a user selects to end the URL access.

* * * * *